United States Patent [19]

Abegg et al.

[11] 3,922,341
[45] Nov. 25, 1975

[54] AEROSOL HAIR SPRAYS CONTAINING ETHYL OR BUTYL MONOESTER OF COPOLYMER OF VINYL MONOMER AND MALEIC ACID

[75] Inventors: Jean-Louis Abegg, Paris; Annie Madrange, Saint-Germain-en-Laye, both of France

[73] Assignee: Societe Anonyme dite: L'Oreal, Paris, France

[22] Filed: Mar. 28, 1974

[21] Appl. No.: 455,809

[30] Foreign Application Priority Data
Mar. 30, 1973  Luxembourg..................... 67330

[52] U.S. Cl........ 424/47; 260/33.4 R; 260/33.8 UA; 424/DIG. 1; 424/DIG. 2; 424/70; 424/71; 424/78
[51] Int. Cl.²........................................... A61K 7/11
[58] Field of Search............ 424/DIG. 1, DIG. 2, 47, 424/70, 71, 78; 260/33.4 R, 33.8 UA

[56] References Cited
UNITED STATES PATENTS

| | | | |
|---|---|---|---|
| 2,599,119 | 6/1952 | McQueen........................ | 424/71 X |
| 2,723,248 | 11/1955 | Wright............................. | 424/71 X |
| 3,130,127 | 4/1964 | Tarpey............................ | 424/71 X |
| 3,144,391 | 8/1964 | Goff................................. | 424/71 X |
| 3,715,428 | 2/1973 | Quasius........................... | 424/47 |
| 3,721,654 | 3/1973 | Schlumbom et al............. | 424/47 X |
| 3,721,655 | 3/1973 | Schlumbom et al............. | 424/47 X |
| 3,733,312 | 5/1973 | Deetman......................... | 424/47 X |

OTHER PUBLICATIONS

Gantres ES Monester Resins, General Aniline & Film Corp., New York, New York, (1967), pp. 4–9 and 11–12.
Drug and Cosmetic Industry, Vol. 104, No. 5, May 1959, p. 149.

Primary Examiner—Sam Rosen
Assistant Examiner—Vera C. Clarke
Attorney, Agent, or Firm—Cushman, Darby & Cushman

[57] ABSTRACT

A hair spray composition for use in aerosol form comprising a mixture of:

a. at least one copolymer containing a repeating unit of the formula

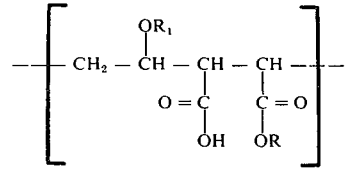

where
R is ethyl or butyl, and
$R_1$ is H or an aliphatic radical containing from 1 to 4 carbon atoms, wherein about 20–35% of the carboxylic groups are neutralized with an organic base;

b. an alcoholic phase comprising about 20–45% by weight of the total weight of the composition;

c. trichlorofluoromethane; and d. a sufficient quantity of nitrous oxide to provide an internal pressure of between 3 and 8 kg/cm² when the composition is placed in a sealed container.

10 Claims, No Drawings

AEROSOL HAIR SPRAYS CONTAINING ETHYL OR BUTYL MONOESTER OF COPOLYMER OF VINYL MONOMER AND MALEIC ACID

The present invention relates to new aerosol lacs for hair, i.e. hair spray.

The field of aerosol lacs has over the past 20 years been the object of numerous research efforts which have led to the selection of certain types of resins, among which we might mention the vinyl acetate-crotonic acid copolymers, polyvinylpyrrolidone, vinylpyrrolidone-vinyl acetate copolymers, and the copolymers of methyl-vinylether and the monoethyl- or monobutyl-ester of maleic acid.

In these aerosol lacs, the preferred propellants are fluorochlorinated hydrocarbons and especially mixtures of dichlorodifluoromethane and trichlorofluoromethane, usually in proportions of about 50/50.

However, for certain of these resins, other propellants have been recommended, especially mixtures of fluorochlorinated hydrocarbons and nitrous oxide and, in particular, mixtures of trichlorofluoromethane, possibly containing a small proportion of dichlorodifluoromethane and nitrous oxide.

The latter types of propellants have more particularly been recommended for the purpose of reducing the alcholic phase of aerosol lacs for hair while guaranteeing good atomizing.

Among the various resins mentioned above, those resulting from the copolymerization of methylvinylether and maleic acid in the form of its ethyl or butyl monoester are presently used in a particular form.

As a matter of fact, these resins involve free carboxylic acid functions which are partly neutralized with the help of an organic base in a proportion of 1–10% and preferably 4–6%.

The aerosol lacs or lacquers, which are made from these resins, do offer good stability in terms of time and acceptable cosmetic qualities but they entail the inconvenience of forming — on the hair — a film which is very slightly soluble in water; this makes it difficult to eliminate it with the help of shampooings and especially with the help of cationic shampooings.

As a matter of fact, in addition to the proper cosmetic properties, that is to say, an excellent lacquering capacity, good brilliance, good performance under humidity, and low hygroscopicity, it is important that the resins can be eliminated easily by washing the hair.

In order to remedy this inconvenience, it has been surprisingly and unexpectedly discovered that it is possible to make excellent lacs or lacquers for hair, having good stability in terms of time and very good elimination upon shampooing, by neutralizing the copolymers of methylvinylethermaleic acid, the latter in the form of its ethyl or butyl monoester in a proportion of 20–35%, and by conditioning them in the form of an aerosol spray container in a mixture with an alcoholic phase corresponding to about 20–45% of the total weight of the content of the spray can and a propellant made up of a mixture of trichlorofluoromethane possibly containing a small quantity of dichlorodifluoromethane and nitrous oxide.

The purpose of this invention thuse is a new industrial product constituting a lac composition for hair, prepared in the form of an aerosol spray can, characterized by the fact that it is made up of a copolymer corresponding to the following formula:

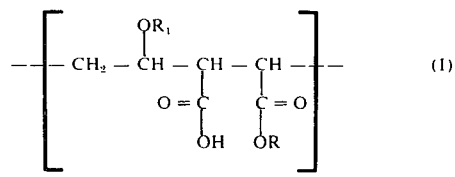

where
R = ethyl or butyl
$R_1$ = H or an aliphatic radical having 1–4 carbon atoms, such as a lower alkyl group.

The free carboxylic acid functions of the copolymer are neutralize with the help of an organic base in a proportion of 20–35% and preferably 23–28%, of an alcoholic phase corresponding to about 20–45% of the total weight of the content of the spray can, of trichlorofluoromethane, and a quantity of nitrous oxide sufficient to raise the pressure inside the spray can to a figure between 3 and 8 kg/cm² and preferably between 3 and 4.5 kg/cm².

The purpose of the invention is thus a lac composition for hair, as defined above, arranged inside an aerosol spray can, that is to say, inside a container equipped with an appropriate valve.

Under these conditions we get excellent aerosol lacs with high lacquering power, giving us a film with good brilliance and low hygroscopicity. Further, this film is very easily eliminated by simple washing with water or by shampooing.

Moreover, these aerosol lacs present excellent stability in terms of time, that is to say, without any precipitation becoming involved, which permits long storage over several months without risk of blockage in the valve system.

The quantity of copolymer in the lacs according to the invention is generally between about 0.5 and 4% but preferably between 1 and 2% by weight with relation to the total weight of the contents of the spray can.

According to the invention, the neutralization rate of 20–35% is critical because, if it is below 20%, we get poor elimination of the film through washing with water or shampooing or if, on the other hand, it is more than 35% we then, over a longer period of time, get a precipitation of the resin which can cause blockage or clogging of the valve system.

The lower limit of the alcoholic phase is also critical because below about 20% we likewise get a precipitation phenomenon.

According to this invention, the alcoholic phase may be made up either of ethanol or isopropanol.

The nature of the propellant is also critical because mixtures of conventional trichlorofluoromethane and dichlorodifluoromethane lead to a precipitation of resin. According to the invention it is therefore indispensable that we use only trichlorofluoromethane in a mixture with nitrous oxide or trichlorofluoromethane containing a small proportion of dichlorodifluoromethane generally not exceeding 15%, in a mixture with nitrous oxide.

The quantity of nitrous oxide which is introduced into the composition essentially depends on the pressure which we want to have in the aerosol spray container.

As indicated above, the pressure inside the spray can is established in such a manner that it will be between 3 and 8 kg/cm² and preferably between about 3 and 4.5 kg/cm².

In accordance with one preferred embodiment, we use, as propellant, a mixture of trichlorofluoromethane and nitrous oxide.

It is important, however, to note that the trichlorofluoromethane, which is present in the liquid form at a temperature below +24°C, is not properly speaking a propellant but at the same time serves as solvent and as diffusion regulator.

According to the invention, the proportion of trichlorofluoromethane is generally between 50 and 75% with relation to the total weight of the content of the aerosol lac.

When the nitrous oxide is introduced into the aerosol spray container under pressure, it is dissolved in the liquid phase which consists mainly of trichlorofluoromethane and the alcoholic phase and it is then progressively desorbed from that liquid phase in order to maintain, inside the spray can, a pressure that will essentially be constant during atomization.

According to various tests, good results are obtained with a pressure of about 3 kg/cm² although, in the case where the compound does not contain dichlorodifluoromethane, it might be preferable to bring the pressure up to about 4–5 kg/cm².

As indicated in Formula I, above, the copolymers which can be used according to the invention either are ethyl monoesters of copolymers derived from a vinyl monomer and maleic acid, or they are butyl monoesters of copolymers derived from a vinyl monomer and maleic acid.

When the substituent $R_1$ represents an aliphatic radical, we are in particular dealing with an alkyl radical having 1–4 carbon atoms, for example, a methyl, ethyl, or isopropyl radical.

Among the vinyl monomers that can be polymerized with maleic anhydride, we might mention the following, although this list is by no means complete: methylvinyl ether, ethylvinyl ether, and isopropyl-vinyl ether.

These copolymers are obtained according to the conventional methods of polymerization as described for example in German Pat. No. 571,665 and in the applicants' French Pat. No. 1,604,705.

These copolymers have a molecular weight between about 15,000 and 60,000 and a viscosity between 1.5 and 6 cps (5% solution in DMF (dimethylformanide) at 34°6C [sic; 34°C].

Among the organic bases used to neutralize the free carboxylic acid functions of the copolymers of Formula I in a proportion of 20–35% are, in particular, amino-alcohols, for example, aminomethyl-propanol, aminomethyl-propanediol, or tri-isopropanolamine, although this list is by no means complete.

The partial neutralization of the copolymers in Formula I is obtained by simply mixing the copolymer with the organic base in a quantity sufficient to obtain the desired neutralization rate.

According to the invention we preferably use the ethyl monoester of the methyl vinyl ether-maleic acid copolymer available under the tradename GANTREX ES 225, having a viscosity of 3.7 cps, and the butyl monoester of this same copolymer, available under the tradename of GANTREZ ES 425, with a viscosity of 5.1 cps. These products are available from the General Aniline and Film Corporation, New York, N.Y. 10020.

The aerosol lacs according to the invention can also contain additives such as plasticizers selected from the following group:

monomethyl ether of ethylene glycol, monoethyl ether of ethylene glycol, ethylene glycol, diethylene glycol, propylene glycol, hexylene glycol, mono-, di-, or triacetate of glycerol, oleyl alcohol, triethylphosphate, dimethyl phthalate, diethyl phthalate, dibutyl phthalate, glycerol monoricinoleate, isopropyl lanolate, lanolin and lanolin derivatives, dimethylpolysiloxane and methylphenylpolysiloxane, and fatty alcohols having 12–18 carbon atoms, oxyethylenated with 2–20 moles of ethylene oxide per mole of alcohol.

The composition may also contain perfumes, coloring agents, cationic products to facilitate combing of the hair, nonionic products to ensure peptization of perfumes, urea to facilitate penetration into the fiber, and silicons to improve the brilliance, or other cosmetic adjuvants.

In particular it can contain products for the treatment of hair, such as, for example, anti-seborrheic products or other treatment products.

The compounds according to the invention are introduced into the aerosol spray cans according to the usual techniques employed in the aerosol industry.

In order better to understand the invention we will now describe several examples of carrying out the invention by way of illustration only, and without any restriction on the scope of the invention.

EXAMPLE 1

An aerosol lac for hair is prepared by mixing the following ingredients: butyl monoester of methylvinylethermaleic acid copolymer available under the tradename

| GANTREZ ES 425 | 1.5 | g |
| --- | --- | --- |
| aminomethylpropanediol | 0.175 | g |
| perfume | 0.06 | g |
| ethanol q.s.p. | 25 | g |
| trichlorofluoromethane ($F_{11}$) | 58.5 | g |
| dichlorodifluoromethane ($F_{12}$) | 14.6 | g |
| nitrous oxide ($N_2O$) | 1.9 | g |

This mixture, when placed into a spray can of 200 cm³, results in an internal pressure of 3.2 kg/cm².

The resin neutralization rate in this example is 25%.

Atomization of this lac provides excellent films which are very easily removed by washing with conventional shampoos.

After 10 months of storage at ambient temperature, there is no resin precipitation.

EXAMPLE 2

An aerosol lac for hair is prepared by mixing the following ingredients:

| GANTREZ ES 425 | 1.5 | g |
| --- | --- | --- |
| tri-isopropanolamine | .32 | g |
| perfume | 0.06 | g |
| ethanol q.s.p. | 25 | g |
| $F_{11}$ | 58.5 | g |
| $F_{12}$ | 14.6 | g |
| $N_2O$ | 1.9 | g |

This mixture, when placed into a 200 cm³ spray can, provides an internal pressure of 3.2 kg/cm².

The resin neutralization rate in this example is 25%.

After application of the lac, the film is easily removed by washing the hair with shampoo.

EXAMPLE 3

An aerosol lac for hair is prepared by mixing the following ingredients:

| | | |
|---|---|---|
| GANTREZ ES 425 | 1.5 | g |
| aminomethylpropanol | 0.164 | g |
| isostearic alcohol oxyethylenated with 3 moles of ethylene oxide per mole of alcohol | 0.1 | g |
| perfume | 0.06 | g |
| ethanol q.s.p. | 25 | g |
| $F_{11}$ | 66 | g |
| $F_{12}$ | 6 | g |
| $N_2O$ | 3 | g |

This mixture, when placed into a 200-cm³ spray can, provides an internal pressure of 3.7 kg/cm² in the spray can.

The resin neutralization rate in this example ib 25%.

EXAMPLE 4

An aerosol lac for hair is prepared by mixing the following ingredients:

| | | |
|---|---|---|
| GANTREZ ES 425 | 1.5 | g |
| aminomethylpropanol | 0.164 | g |
| isostearic alcohol oxyethylenated (as in Example 3) | 0.1 | g |
| perfume | 0.06 | g |
| ethanol q.s.p. | 25 | g |
| $F_{11}$ | 58.5 | g |
| $F_{12}$ | 14.6 | g |
| $N_2O$ | 1.9 | g |

This mixture, when placed into a 200-cm³ spray can, provides an internal pressure of 3.2 kg/cm³ inside the spray can.

The resin neutralization rate in this example is 25%.

EXAMPLE 5

An aerosol lac for hair is prepared by mixing the following ingredients:

| | | |
|---|---|---|
| GANTREZ ES 425 | 1.5 | g |
| aminomethylpropanol | 0.115 | g |
| isostearic alcohol oxyethylenated (as in Example 3) | 0.1 | g |
| perfume | 0.06 | g |
| ethanol q.s.p. | 20 | g |
| $F_{11}$ | 76 | g |
| $N_2O$ | 4 | g |

This mixture, when placed in a 200-cm³ spray can, provides an internal pressure of 4 kg/cm² in the can.

The resin neutralization rate in this example is 20%.

EXAMPLE 6

An aerosol lac for hair is prepared by mixing the following ingredients:

| | | |
|---|---|---|
| ethyl monoester of methylvinylether-maleic acid copolymer available under the tradename GANTREZ ES 225 | 2 | g |
| aminomethylpropanol | 0.23 | g |
| isostearic alcohol oxyethylenated (as in Example 3) | 0.1 | g |
| Silicone oil | 0.1 | g |
| perfume | 0.06 | g |
| ethanol q.s.p. | 25 | g |
| $F_{11}$ | 71.25 | g |
| $N_2O$ | 3.75 | g |

This mixture, when placed in a 200-cm³ spray can, provides an internal pressure of 3.8 kg/cm² in the can.

The resin neutralization rate in this example in 25%.

EXAMPLE 7

An aerosol lac for hair is prepared by mixing the following ingredients:

| | | |
|---|---|---|
| GANTREZ ES 425 | 1.98 | g |
| aminomethylpropanol | 0.21 | g |
| isostearic oxyethylenated alcohol (as in Example 3) | 0.09 | g |
| silicone oil | 0.09 | g |
| perfume | 0.06 | g |
| ethanol q.s.p. | 33 | g |
| $F_{11}$ | 52.3 | g |
| $F_{12}$ | 13 | g |
| $N_2O$ | 1.7 | g |

This mixture, when placed in a 200-cm³ spray can, provides an internal pressure of 3.2 kg/cm² in the can.

The resin neutralization rate in this example is 25%.

EXAMPLE 8

An aerosol lac for hair is prepared by mixing the following ingredients:

| | | |
|---|---|---|
| GANTREZ ES 225 | 1.8 | g |
| aminomethylpropanol | 0.21 | g |
| isostearic alcohol oxyethylenated (as in Example 3) | 0.18 | g |
| perfume | 0.07 | g |
| ethanol q.s.p. | 30 | g |
| $F_{11}$ | 66.5 | g |
| $N_2O$ | 3.5 | g |

This mixture, when placed into a 200-cm³ spray can, provides an internal pressure of 3.7 kg/cm² inside the can.

In this example, the resin neutralization rate is 25%.

EXAMPLE 9

An aerosol lac for hair is prepared by mixing the following ingredients:

| | | |
|---|---|---|
| GANTREZ ES 225 | 1.57 | g |
| aminomethylpropanol | 0.26 | g |
| perfume | 0.09 | g |
| ethanol q.s.p. | 45 | g |
| $F_{11}$ | 52.25 | g |
| $N_2O$ | 2.75 | g |

This mixture, when placed into a 200-cm³ spray can, provides an internal pressure of 3.3 kg/cm² inside the can.

In this example, the resin neutralization rate is 35%.

We claim:

1. A lacquer composition for use as a hair spray comprising a mixture of
   a. 0.5–4 weight percent of a copolymer containing a repeating unit of the formula:

$$\left[ -CH_2-CH-CH-CH- \atop {O=C \quad C=O \atop OH \quad OR} \right]$$

where:
R is ethyl or butyl,
$R_1$ is alkyl having 1–4 carbon atoms, and 20–35% of the free carboxylic acid functions of the copolymer are neutralized with an organic base, said copolymer having a molecular weight between about 15,000 and 60,000;
b. an alcoholic phase corresponding to about 20–45% by weight of the total weight of the composition; and as a propellant a mixture consisting essentially of
c. trichlorofluoromethane and
d. nitrous oxide; wherein the composition is confined under an internal pressure between 3 and 8 kg/cm$^2$.

2. The composition of claim 1, wherein 23–28% of the free carboxylic acid functions of the copolymer are neutralized and the internal pressure is between 3 and 4 kg/cm$^2$.

3. The composition of claim 1, wherein the copolymer is the ethyl monoester of methylvinylether-maleic acid copolymer.

4. The composition of claim 1 wherein the copolymer is the butyl monoester of methylvinylether-maleic acid copolymer.

5. The composition of claim 1, wherein the copolymer is present in an amount of about 1–2% by weight with respect to the total weight of the composition.

6. The composition of claim 1, wherein the organic base used to neutralize the free carboxylic acid functions of the copolymer is an aminoalcohol.

7. The composition of claim 6, wherein the aminoalcohol is selected from the group consisting of aminomethylpropanol, aminomethylpropanediol, and tri-isopropanolamine.

8. The composition of claim 1, wherein the alcoholic phase is ethyl or isopropyl alcohol or a mixture thereof.

9. The composition of claim 1 which also includes dichlorodifluoromethane not in excess of 15 percent by weight based on the weight of the total composition.

10. The composition of claim 1, wherein the quantity of trichlorofluoromethane is between about 50 and 75% by weight based on the total weight of the composition.

* * * * *

UNITED STATES PATENT OFFICE
CERTIFICATE OF CORRECTION

Patent No. 3,922,341  Dated November 25, 1975

Inventor(s) Jean-Louis Abegg and Annie Madrange

It is certified that error appears in the above-identified patent and that said Letters Patent are hereby corrected as shown below:

Column 6, between lines 56-63 (Claim 1), the structural formal should read --

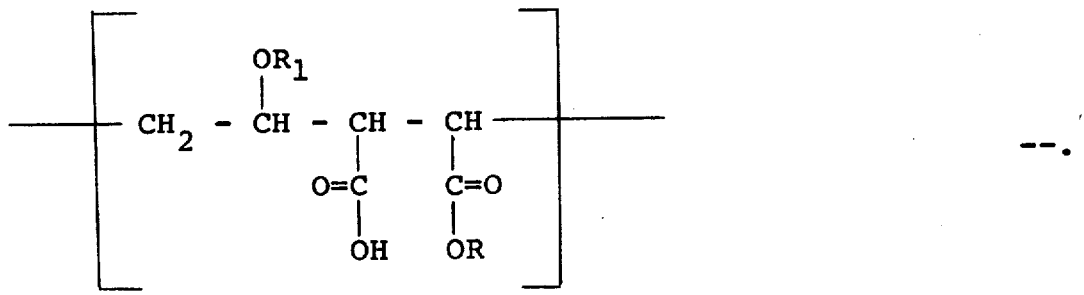

--.

Signed and Sealed this

Thirty-first Day of August 1976

[SEAL]

Attest:

RUTH C. MASON
Attesting Officer

C. MARSHALL DANN
Commissioner of Patents and Trademarks